E. E. GOLD.
LOCK FOR COUPLINGS.
APPLICATION FILED FEB. 1, 1911.
1,046,459.
Patented Dec. 10, 1912.
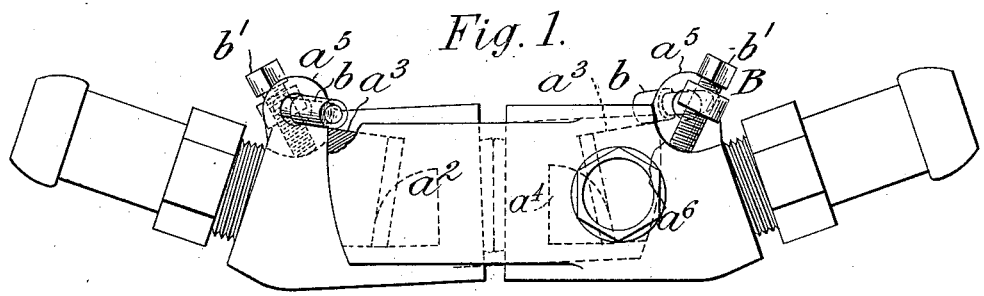
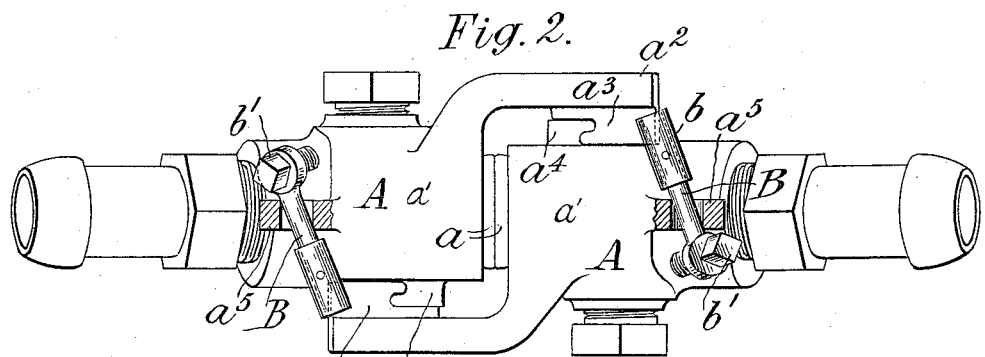
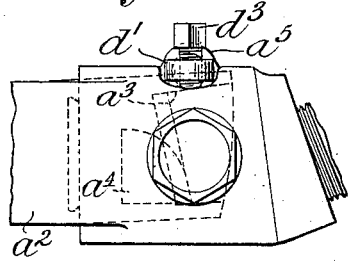
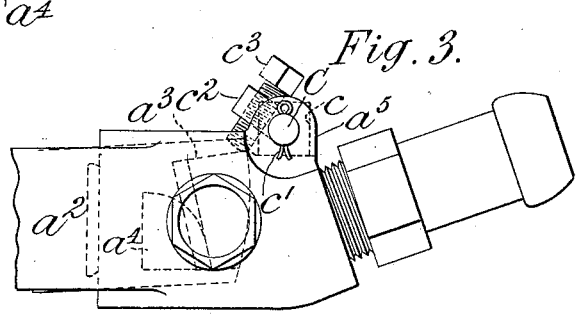
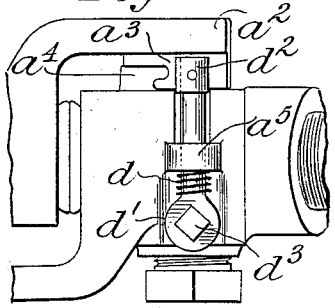
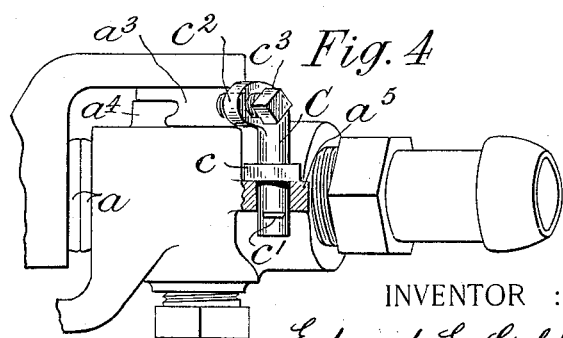
WITNESSES:
René Bruine
Fred White
INVENTOR:
Edward E. Gold,
By Attorneys,
Fraser Turk & Myers

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

LOCK FOR COUPLINGS.

1,046,459.  Specification of Letters Patent.  Patented Dec. 10, 1912.

Application filed February 1, 1911. Serial No. 605,912.

*To all whom it may concern:*

Be it known that I, EDWARD E. GOLD, a citizen of the United States, residing in the borough of Manhattan, city, county, and State of New York, have invented certain new and useful Improvements in Locks for Couplers, of which the following is a specification.

My invention relates to locks for positively locking in coupling position the mating couplers used for coupling together air hose or steam hose upon railway trains. Great difficulty is experienced in such case with couplers that are not held together by a positive lock, as in going around curves, etc., the coupled hose is pulled nearly straight, thereby partially unlocking the lock. Afterward it is very probable that the coupling will not resume its original position but will remain partly open, permitting the escape of steam, etc.

My invention has for its object to overcome this defect by providing a simple, cheap and efficient positive lock which will hold the couplers in coupling position at all times. Further to provide such a lock which will not get broken or easily get out of order and which may be applied to couplers whether of identically the same construction or not, and further which may be applied to couplers now in use without requiring reconstruction thereof. Further to provide a lock which may be adjusted as the parts wear so as to compensate therefor and to hold the ports tightly together notwithstanding such wear.

In carrying my invention into effect, I provide a member of the coupler with a lever which extends across the overlapping ends of both members of the coupler, and in connection with said lever I employ a means, preferably a set screw, whereby upon the same being turned the two parts of the coupler are forced together and are positively locked in such coupling position.

My improved lock is not necessarily applied to couplers of any peculiar or distinctive conformation. It may be well employed in connection with the coupling of my Patent No. 913,950, dated March 2, 1909, in connection with which I have illustrated it in the accompanying drawings.

The drawings show desirable forms in which my invention may be embodied.

Figure 1 is a side view of a coupler containing my invention. Fig. 2 is a plan view of the same partly in section. Fig. 3 is a side view of a coupler containing a modified form. Fig. 4 is a plan view of the modification of Fig. 3 partly in section. Fig. 5 is a side view of a still further modified form of my invention, and Fig. 6 is a plan view of the modification of Fig. 5.

In carrying my invention into effect, I provide a lever which is mounted in a perforated lug upon the body portion of one part of a coupler and the end of which extends over the overlapping portion of the mating coupler. I further provide the said lever with means whereby it may be employed to force the locking flanges of the couplers together by forcing one coupler down upon the other. Such means may well take the form of a set screw mounted in one end of said lever, and adapted to engage either the body portion of a coupler or the overlapping portion of the mating coupler. Whichever form is employed, the pressure will be exerted upon the overlapping portion of the mating coupler, forcing it down to coupling position where it is held and firmly and positively locked by said lever and set screw.

In the particular type of coupler in connection with which my invention is illustrated two heads are employed, each of the same construction. Each head as a whole I designate by the letter A. The said couplers are provided with direct ports $a$ formed on the inner ends of body portions $a'$ and at one side of the said body portion each coupler is provided with an extension $a^2$ which overlaps the body portion $a'$ of the mating coupler. Upon the said extension is carried a flange $a^3$ which engages a projection $a^4$ upon the body portion of the mating coupler and these are inclined relatively to each other, so that as the flange $a^3$ is forced down upon the projection $a^4$ the ports $a$ will be brought to coupling position. Each of the couplers is provided with a perforated lug $a^5$ within which the locking bolt is carried.

In the form illustrated in Figs. 1 and 2 the locking lever B is fulcrumed loosely in the lug $a^5$, so that it may turn therein. It may be held in position by a sleeve $b$ which is pinned to its forward end. At its rear end the said lever receives a set screw $b'$, the lower end of which is seated against an inclined face $a^6$ upon the coupler body $a'$. In this form the lever may be turned by hand to bring the set screw in contact with the inclined face $a^6$ and so that the forward end of the lever shall be over a part of the overlapping portion of the mating coupler, as for instance the flange $a^3$. The set screw $b'$ being then screwed down will force the forward end of the lever down, carrying with it the overlapping end of the mating coupler, and a positive and secure lock will be afforded. The upper surface of the body portion $a'$ is slightly rounded transversely so that the part thereof next to the flange $a^3$ is below the top of said flange, whereby the lever may freely exert pressure upon said flange. In the form shown in Figs. 3 and 4 the coupler is similarly constructed and is likewise provided with a perforated lug $a^5$. The lever, which in this instance I designate C, is mounted in the perforated lug $a^5$ but is not permitted to turn therein, as it is prevented from turning by a square nut $c$ which is seated on a squared part of the bolt and engages the surface of the body portion of the coupler. A cotter pin $c'$ may be passed through the lever on the opposite side of the lug $a^5$ to retain it in position. The opposite end of the lever is offset slightly at $c^2$ and is inclined relatively to the horizontal, as illustrated in Fig. 3. It is perforated to receive set screw $c^3$ which passes through the same and engages against flange $a^3$ of the overlapping part of the mating coupler. Sufficient room is provided when the set screw $c^3$ is unscrewed to permit the couplers to be uncoupled. The coupler having been assembled and placed in coupling position, screw $c^3$ may be tightened, forcing the couplers together where they will be positively locked in coupling position by the said lever and said screw.

The form of lock illustrated in Figs. 3 and 4 is claimed specifically in a later application Serial No. 639,612, filed July 20, 1911.

In the form illustrated in Figs. 5 and 6 the couplers are similarly constructed as in the previous figures and are likewise provided with a perforated lug $a^5$. In this form, however, the lever, which I shall here designate D, is mounted as before in the perforated lug $a^5$ but slides longitudinally over the overlapping part of the mating coupler. A spring $d$ is coiled about the lever and presses at one end against the head $d'$ and at its other end against the perforated lug $a^5$ and normally tends to withdraw the lever from coupling position. A sleeve $d^2$ is pinned to the lever at its forward end and tends to prevent the spring $d$ from withdrawing the lever out of the perforated lug $a^5$. The head $d'$ of the lever is illustrated as being slightly enlarged and is perforated to receive a set screw $d^3$ which is tapped into the same and engages the body $a'$ of the coupler. The lever D has rather a loose fit in the perforated lug $a^5$ so that when its forward end is pressed, against the impulse of spring $d$, over the flange $a^3$ of the overlapping end of the mating coupler, and the said set screw $d^3$ is screwed down, the forward end of the lever will forcefully press upon the overlapping end of the mating coupler and force the same to coupling position, where it will be securely and firmly held by the positive lock provided. The means for adjusting the locking lever to locking position, illustrated as a set screw, also provides a lock which has the capacity of compensating for wear upon the gaskets, etc. As said parts wear, which would otherwise produce a leaky joint, the set screw may be screwed farther down, thereby forcing the overlapping arm farther down and drawing the ports tightly together. This will produce a tight joint at the ports and will effectually overcome any looseness caused by such wear.

While I have illustrated several forms in which my invention may be embodied, I deem the same to be capable of application in other forms as well and not strictly limited to the particular forms illustrated, as modifications and equivalent devices may be employed within the limits of the appended claims.

What I claim is:—

1. A lock for couplers having overlapping portions, comprising a lever fulcrumed upon one member and having one end adapted to engage the overlapping portion of one member, and a set screw carried by said lever and adapted to engage the overlapping portion of the other member, and to force the said overlapping members together and to positively lock them in coupling position.

2. A lock for couplers having overlapping portions, comprising a perforated lug upon one member, a lever mounted therein and having one end adapted to engage the overlapping portion of one member, and a set screw carried by said lever and adapted to engage the overlapping portion of the other member, and to force the said overlapping members together and to positively lock them in coupling position.

3. A coupler having a direct port, a body portion, and an extension adapted to overlap the body portion of the mating coupler, a flange and projection upon said overlapping portion and said body portion respectively, a lever fulcrumed upon the body portion of one coupler and adapted to extend over the overlapping portion of the mating coupler, and a set screw in said lever and adapted to engage one of said coupler members and to force the opposite end into engagement with the other coupler member and to positively lock said coupler in coupling position.

4. A lock for couplers having overlapping portions comprising a lever loosely fulcrumed in bearings in one coupler member, a set screw carried by one end of said lever and adapted to engage an inclined seat in the coupler and to swing the lever in its bearings, whereby its free end is swung over and down upon the overlapping end of the mating coupler, thereby forcing the couplers together and positively locking them in coupling position.

5. A lock for couplers having overlapping portions comprising a lug upon one member, a locking lever mounted therein, said lever adapted to be moved over the overlapping portion of the mating coupler, a set screw carried by said lever and adapted to cause said set screw and the end of said lever to engage the respective overlapping portions of said coupler, and to force the said overlapping portions together and to lock them in coupling position.

6. A lock for couplers having overlapping members comprising a lever fulcrumed in a perforated lug upon the upper surface of the body of one of said coupler members, and located transversely thereof and having its end adapted to extend over the arm of the overlapping member, a set screw mounted on one end of said lever and adapted to engage the body of the coupler member upon which the lever is mounted and to force the opposite end into contact with the said overlapping arm, thereby positively locking said coupler in coupled position.

7. A positive lock for direct port couplers each having a body portion and an arm overlapping the body portion of the mating coupler, comprising a lever fulcrumed intermediate its ends upon one member and extending substantially transversely thereof and adapted to extend over the arm of the mating coupler, and adjustable means carried by said lever at one side of the fulcrum and adapted to engage one of said coupler members and to cause the other end of said lever to engage with the other coupler member and to force the said coupler members to coupling position and to positively lock them in such position and said adjustable means adapted to compensate for wear upon the parts.

8. A lock for direct port couplers each having a body portion and an arm adapted to overlap the body portion of the mating coupler comprising a lever fulcrumed in a perforated lug upon the upper surface of the body of one of said coupler members, and located transversely thereof and having its end adapted to extend over the arm of the overlapping member, adjustable means at one end of said lever adapted to engage the body of the coupler member upon which the lever is mounted and to force the opposite end into contact with the said overlapping arm, thereby positively locking said coupler in coupled position.

In witness whereof, I have hereunto signed my name in the presence of two subscribing witnesses.

EDWARD E. GOLD.

Witnesses:
THOMAS F. WALLACE,
FRED WHITE.

---

Copies of this patent may be obtained for five cents each, by addressing the "Commissioner of Patents, Washington, D. C."